(12) United States Patent
Stuckey

(10) Patent No.: US 9,914,385 B1
(45) Date of Patent: Mar. 13, 2018

(54) LEAD STRAP AND PULLEY TIE DOWN ASSEMBLY

(71) Applicant: Joshua D. Stuckey, Lancaster, PA (US)

(72) Inventor: Joshua D. Stuckey, Lancaster, PA (US)

( * ) Notice: Subject to any disclaimer, the term of this patent is extended or adjusted under 35 U.S.C. 154(b) by 496 days.

(21) Appl. No.: 14/466,955

(22) Filed: Aug. 22, 2014

Related U.S. Application Data

(60) Provisional application No. 61/868,697, filed on Aug. 22, 2013.

(51) Int. Cl.
*B60P 7/06* (2006.01)
*A44B 11/00* (2006.01)

(52) U.S. Cl.
CPC ............. *B60P 7/06* (2013.01); *A44B 11/006* (2013.01)

(58) Field of Classification Search
CPC ....... A44B 11/06; A44B 11/065; A44B 11/12; A44B 11/125; A44B 11/16; B60P 7/0823
USPC .............................................. 24/170, 68 CD
See application file for complete search history.

(56) References Cited

U.S. PATENT DOCUMENTS

| | | | |
|---|---|---|---|
| 2,998,626 A | 9/1961 | Prete | |
| 3,678,542 A | 7/1972 | Prete | |
| 4,051,743 A | 10/1977 | Gaylord | |
| 4,567,628 A | 2/1986 | Prete | |
| 4,878,270 A | 11/1989 | Westerkamp | |
| 5,423,108 A | 6/1995 | Brennan | |
| 5,467,508 A * | 11/1995 | Feng | A44B 11/06 24/170 |
| 5,920,963 A * | 7/1999 | Chou | F16G 11/106 24/170 |
| 6,547,218 B2 | 4/2003 | Landy | |
| 7,640,633 B2 * | 1/2010 | Chou | A63B 33/002 24/170 |
| 8,500,379 B2 | 8/2013 | Harrigan | |
| 8,973,884 B1 | 3/2015 | Stuckey | |
| 2009/0229086 A1* | 9/2009 | Chiang | A63B 33/002 24/170 |
| 2010/0137112 A1* | 6/2010 | Harker | A63B 21/0552 482/92 |
| 2011/0209314 A1 | 9/2011 | Miller | |
| 2011/0209315 A1 | 9/2011 | Miller | |
| 2013/0104354 A1 | 5/2013 | Miller | |
| 2013/0326848 A1* | 12/2013 | Strahl | B60P 7/0823 24/69 ST |

* cited by examiner

*Primary Examiner* — Abigail E Troy

(57) ABSTRACT

A first adjuster portion joined to a second adjuster portion whereby the first adjuster portion is oriented to receive one of multiple loops of strap and said second adjuster buckle is oriented to receive an opposing lead strap. The multiple loops of strap are routed so as to create mechanical advantage by pulling on the free end of the strap, commonly referred to as a block and tackle. The lead strap enables an operator to quickly and conveniently pre-tension both the block and tackle and lead straps by removing an un-tensioned length of the lead strap before having to apply increased leverage through the block and tackle strap. That is, the first adjuster arrangement may be operated only to tension a block and tackle strap that has been pre-tensioned with the second adjuster, thereby facilitating the use of the combined assembly.

15 Claims, 6 Drawing Sheets

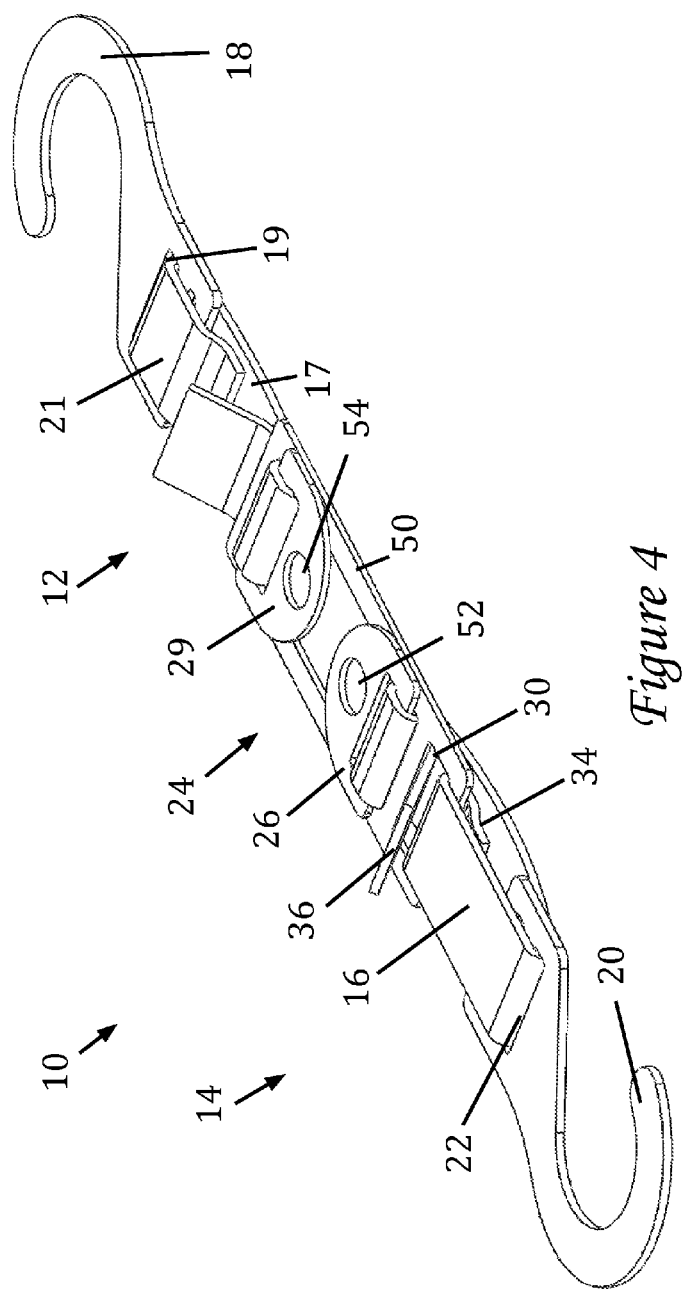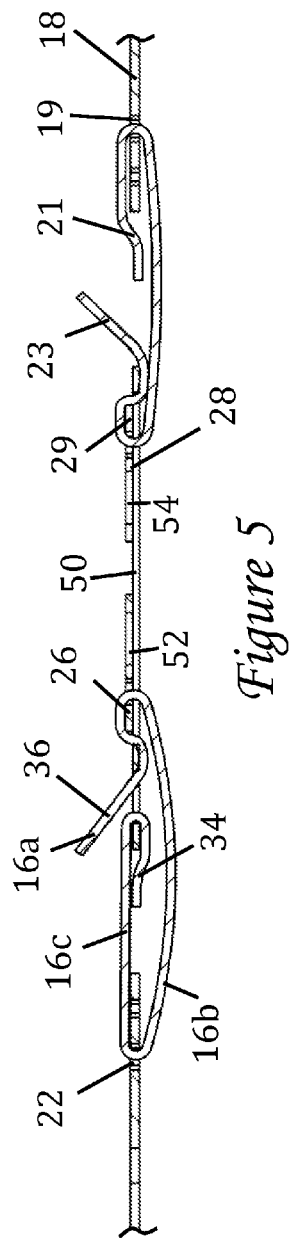

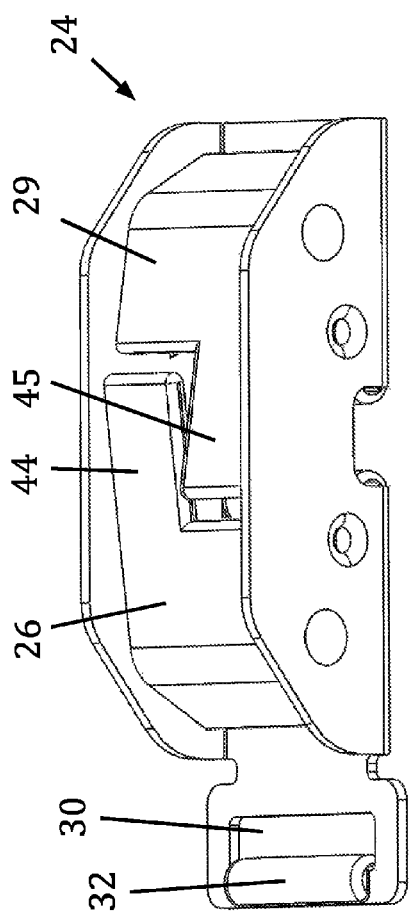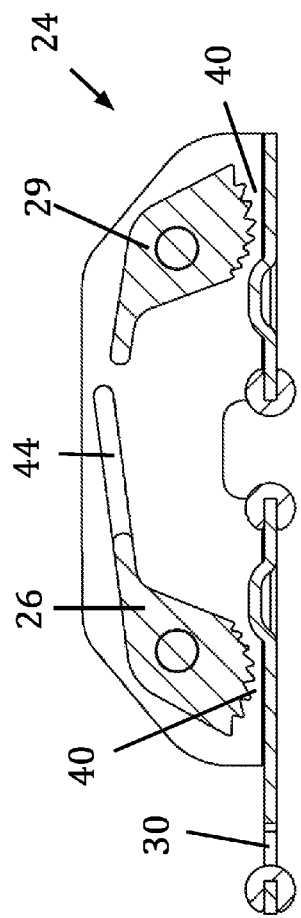

LEAD STRAP AND PULLEY TIE DOWN ASSEMBLY

CROSS-REFERENCE TO RELATED APPLICATIONS

This application claims the benefit of provisional patent application number 61/868,697, filed Aug. 22, 2013 by the present inventor.

FIELD OF THE INVENTION

The present invention relates generally to fastening devices and, more particularly, to adjuster buckles, strap tensioners, cargo retraining devices and the like for tightening and tensioning straps. Any such device is used to lock the tension on a rope or strap for the purpose of holding a load.

BACKGROUND OF THE INVENTION

Within the field there are two primary types of load securing devices; the first being a ratchet style tensioning device and the second being cam locking device. There are many applications for both of these devices and they are widely used throughout many industries.

In the case of the ratchet tensioning device, there are a number of drawbacks, the first being in the complexity of the device and its use. The ratchet and webbing system is made of many movable parts that are not immediately clear how to operate or actuate. This can lead to confusion and outright inoperability of the device depending on the users prior knowledge. The routing of the webbing, the release mechanism, and the actuation direction are all things that are not intuitive for people to operate.

Another negative aspect of the ratchet is the complexity of the design. The system has many parts including but not limited to; attachment hardware, springs and multiple steel stampings. All of these things increase to time and complexity of assembly as well as increase to chances that a part or assembly could fail.

The cam-locking device solves the immediate drawbacks of the ratchet device buy simplifying the design complexity. The total number of parts is less than one half of that of a ratchet style device. With the simplification of design comes the clearer easy to use function of the design. However the cam style tie down has its own major flaws. The first being that the device can only apply a tension that is slightly less than the input force from the user, considering the loss of friction.

It has been considered to use a block and tackle in combination with a cam style tie-down as in US patent application 2011/0209314. This would increase the tension on the load while decreasing the input force required from the user. Of course this design is not without its drawbacks. The multiple loops of webbing can get twisted or convoluted thereby eliminating the benefit of the mechanical advantage. Additionally the multiple loops of webbing must be in a relatively straight line between the load attachment and the cam lock in order for the mechanical advantage not to be overcome with friction in the system. A straight line for the entire length of the tie down is a rare occurrence as many times the attachment point is not conveniently located or the strapping is fed over the load before being tightened.

Significant advantages would be realized by an improved belt tensioning system that would be simple to use, allow an increase in mechanical advantage, and adaptable to work in many situations.

SUMMARY OF THE INVENTION

Accordingly, the present invention, in any of the embodiments described herein, may provide one or more of the following advantages. The present invention is a first adjuster portion joined to a second adjuster portion whereby the first adjuster portion is oriented to receive one of multiple loops of strap and said second adjuster buckle is oriented to receive an opposing lead strap. The multiple loops of strap are routed so as to create mechanical advantage by pulling on the free end of the strap, commonly and henceforth referred to as a block and tackle. The lead strap enables an operator to quickly and conveniently pre-tension both the block and tackle and lead straps by removing an un-tensioned length of the lead strap before having to apply increased leverage through the block and tackle strap. This advantageously enables the operator to utilize the block-and-tackle to tension the straps only when the requisite tensioning force cannot be provided by an unaided operator. That is, the first adjuster arrangement may be operated only to tension a block and tackle strap that has been pre-tensioned with the second adjuster, thereby facilitating the use of the combined assembly. As a result, the present invention allows a wide variety of loads to be quickly and securely tightened with a level of ease that is not found in any other tie down arrangement.

In one preferred embodiment, said first and said second adjusters are a joined in a unitary member forming a single, integrated tensioning assembly. Additionally the adjuster assembly can have two belt locking devices incorporated into the design; the first for the block and tackle arraignment and the second for the lead strap arraignment. In one particular embodiment, the belt locking device is a cam and is oriented so that the free end of one cam is proximate the free end of the second cam, whereby the arrangement advantageously allows for simultaneous actuation of the cam release. In addition, the option of independent release is still available and preferred in some instances.

In an alternative embodiment, the belt locking device is a cam and includes a housing adapted to slidably receive the block and tackle strap. The housing has a pressure plate with a first restraining surface over which the strap slides. Also included in the cam buckle is a pawl movably mounted to the housing. The pawl has a second restraining surface and is biased in an engaged position to restrain the lead strap between the first and second restraining surfaces so as to prevent movement of the lead strap in one or both directions. The pawl also may assume a disengaged position wherein the lead strap can move freely between the first and second restraining surfaces. In one embodiment, the cam buckle is unidirectional, preventing movement of the lead strap a single direction. Particularly, the pawl, when in the engaged position, prevents movement of the lead strap in a direction that loosens the lead strap while allowing movement of the lead strap in a direction that tensions the lead strap.

In one aspect of the invention, a first belt locking device is a common cam buckle while a second belt locking device is an over center belt lock where by the lead strap is fed through the lock and pre-tensioned prior to locking the over center lock by flipping the locking arm. In this aspect the over center adjuster requires more input from the user but increases the allowable force loaded on the tie down assembly as compared to two cam buckles in an assembly. It is foreseeable that both the first and the second belt locking devices are over center locks again increasing the strength and security of the load being tied down.

Naturally, it is understood that the first and second adjuster could be any combination of known adjusters. The previously described cam and over center adjuster are just two of the variations of devices known to be used for adjusting and locking strapping. Two other such devices are a d-ring, typically used to tighten and hold a waist belt and another is described in patent US6820310. Many other adjusting and locking devices currently exist and many more are yet to be invented, all of such devices apply to the invention described herein.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a second embodiment of another embodiment of the present invention consisting of a more simplified sliding plate lock.

FIG. 5 is a section view of the second embodiment shown in FIG. 4

FIG. 7 is the oblique view of a unique cam locking device with overlapping release arms.

FIG. 8 is a section view of the components shown in FIG. 7. Showing the detail of the cam locking mechanism and the relative orientation for clarity.

DETAILED DESCRIPTION

Figure 1:
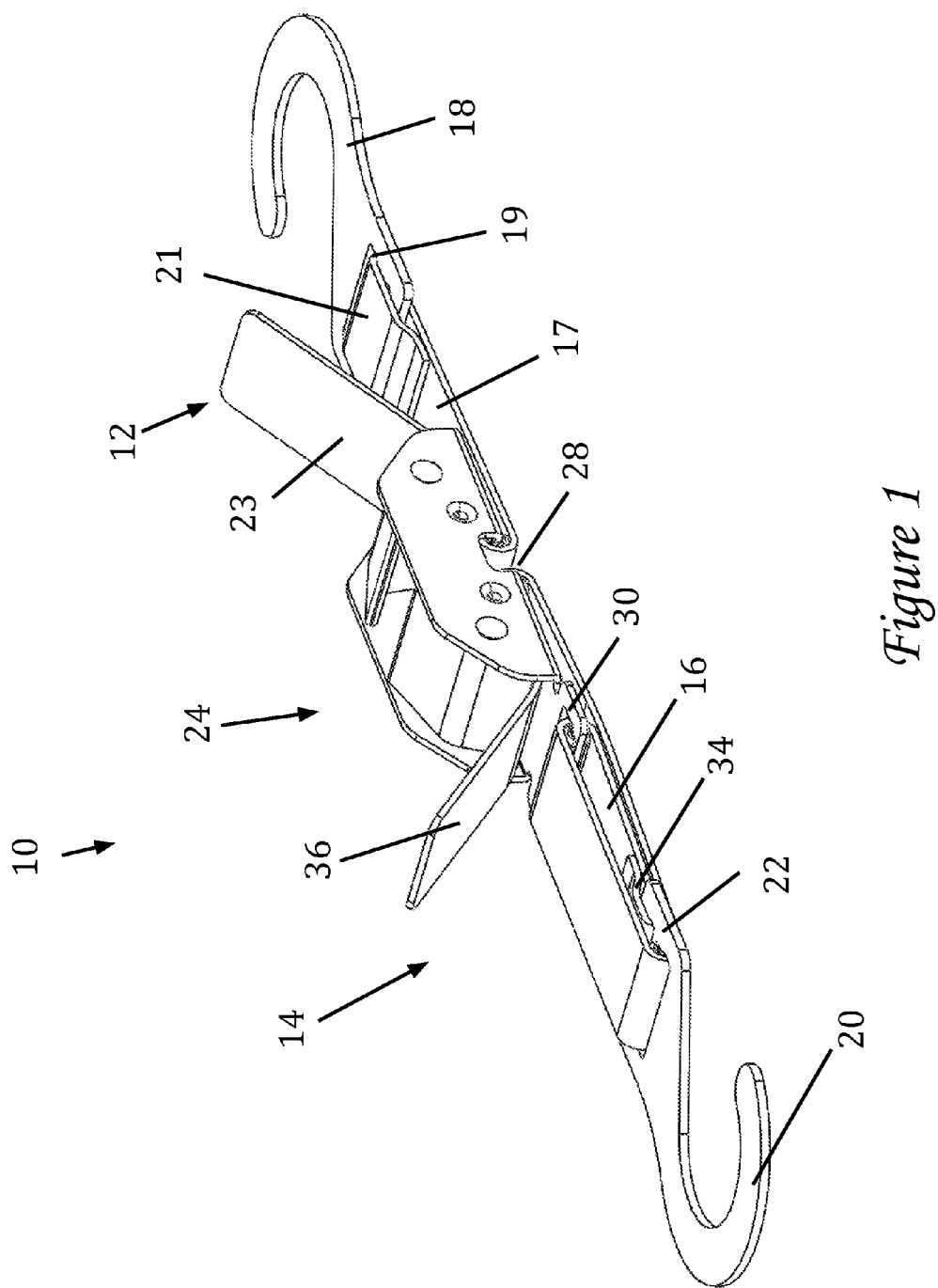
FIG. 1 is an embodiment of a tie down strap incorporating the principles of the present invention.
Figure 2:
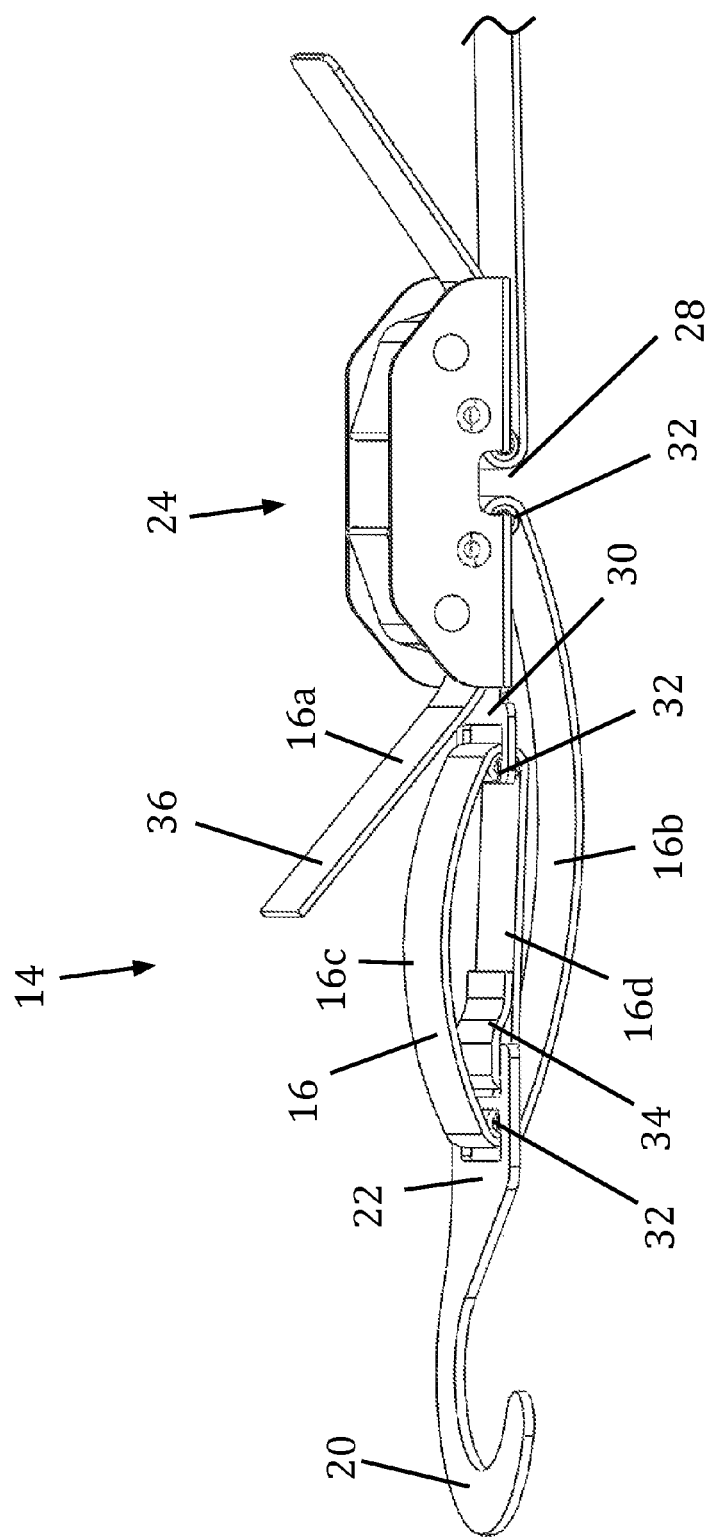
FIG. 2 is a detail view of the block and tackle portion of the tie down strap shown in FIG. 1.
Figure 3:
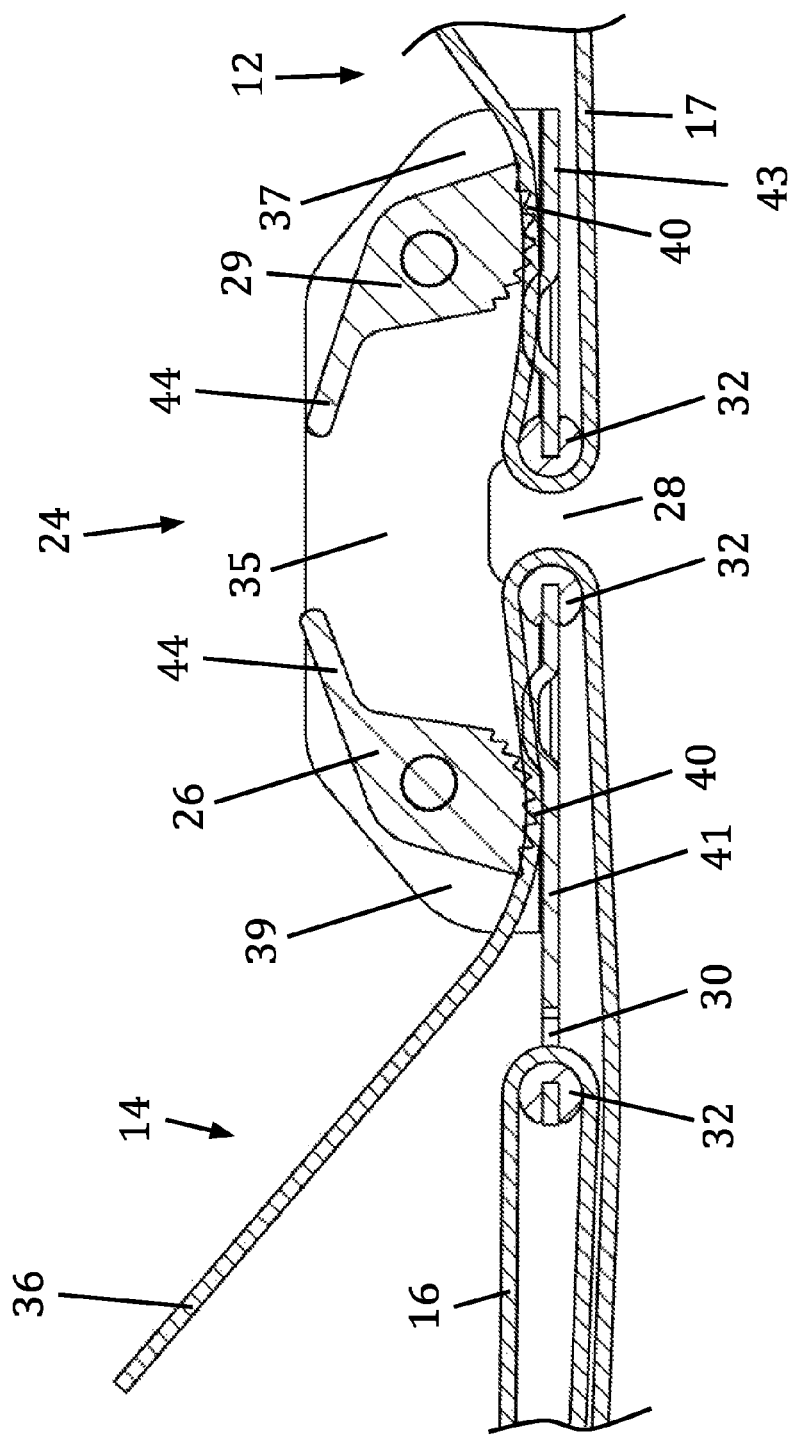
FIG. 3 is a section view of the two belt locking devices and two adjuster portions previously shown in FIG. 1 and FIG. 2. This is for added clarity.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined as the system would normally rest on the floor or a similarly level surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

A tie down strap 10 is shown in FIGS. 1-6. comprising a lead strap adjustment 12 and an opposing block and tackle strap adjustment 14, both made up of flexible webbing 16, 17. Two hooks are attached, one on each end, a single attachment hook 18 and a hook 20 that includes at least one guide portion 22 of the block and tackle arrangement 14. The adjuster assembly 24 is comprised of a first guide portion 30 positioned to accept the flexible webbing 16 from the block and tackle arrangement 14 and a second guide portion 28 is positioned to accept flexible webbing 17 from the lead strap arrangement 12. The adjuster assembly 24 also includes at least one guide portion 30, 28 to allow the block and tackle arraignment 14 and lead strap 12 to be possible. The adjuster assembly 24 also includes a connection apparatus or joining frame 35, which in the present invention joins the two sides of the lead strap 12 and the block and tackle arrangement 14 into one unitary frame or housing. In some cases the guide portion 30,28 may have a slide pivot 32 for a friction reduction device, which is preferably added to improve the functionality of the block and tackle arrangement. The slide pivot 32 could also be a roller and achieve the desired effect.

Figure 6:
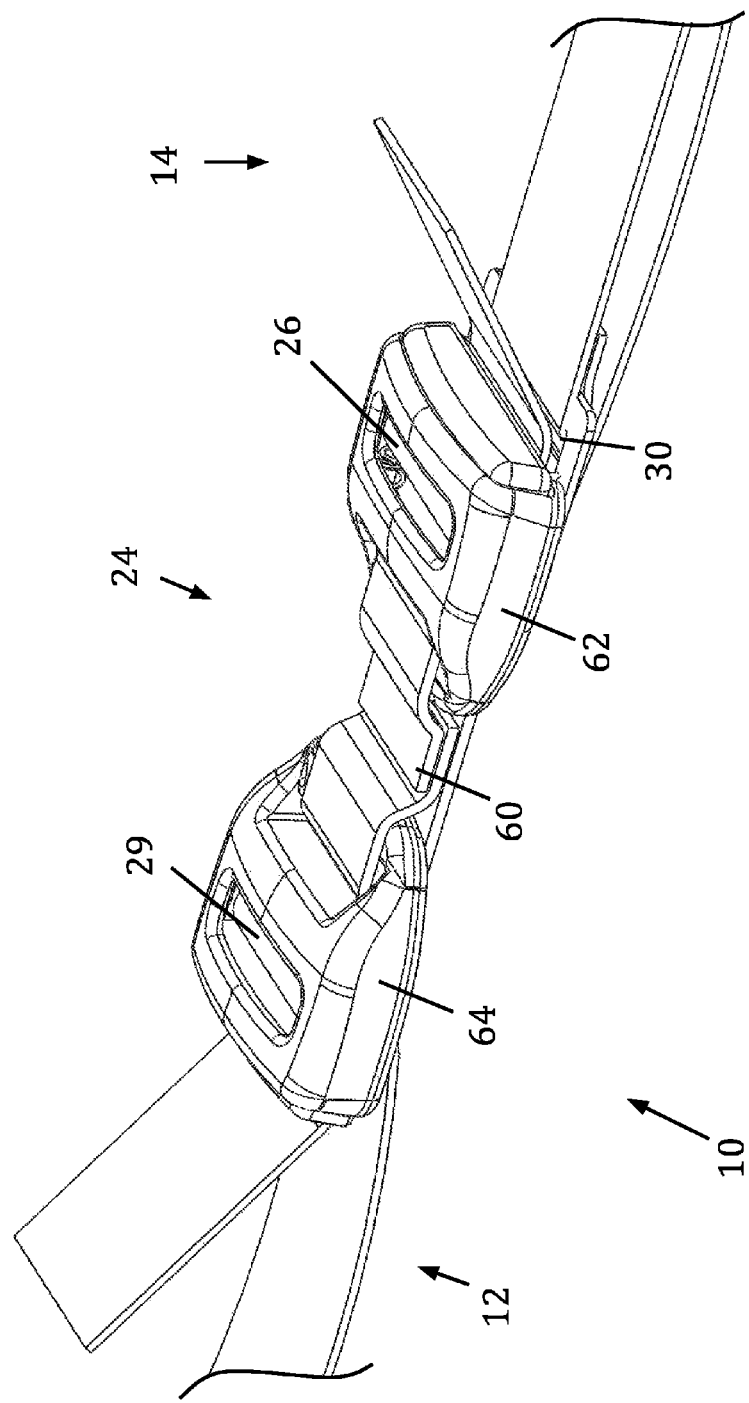
FIG. 6 is a detail view of a tie down using a sewn connection joint for the adjuster assembly portion and another variation of the belt locking device.

A block and tackle adjuster 14 embodying aspects of the present invention is presented in FIGS. 1 through 6. The adjuster 14 comprises a first guide portion 22, a second guide portion 30, and adjuster strap 16. One or more of the adjuster portions 22, 30 may include a roll 32 around which the adjuster strap 16 is directed so that it loops back and forth between the guide portions 22, 30, much in the manner of a pulley block or block and tackle pulley system. FIGS. 4 through 6 show the assembly 10 with no roll 32 thus creating some increased friction but still increasing mechanical advantage none the less. A fixed end 34 of the adjuster strap 16 is connected to one of the guide portions 22, 30; the opposite (free) end 36 of the adjuster strap 16 is free so that it may be pulled by a user while tightening a load or other use. Mechanical advantage of the tension applied to free end 36 is based on the number of loops 16a, 16b, 16c, 16d spanning between the guide portions 22, 30. In the embodiment shown, the tightening tension applied by the adjuster 14 is four times the tension applied to the free end 36. Other configurations are permissible and are arranged by relocation of the fixed end 34 or changing the number of loops 16a, 16b, 16c, 16d made by the adjuster strap 16. FIGS. 4 through 6 show such an arrangement, where the mechanical advantage drops to three due to the reorientation of the fixed end 34 with respect to guide portions 22, 30.

In the embodiment shown, hook or fastening member 20 is connected directly to second adjuster portion 22 to decrease the parts used and complexity of design. A skilled artisan will notice that the same function and result may be accomplished by using a short length of flexible web or the like to connect the second adjuster portion 22 and the hook or fastening member 20. It is also noted that hooks or fastening members 18, 20 may be dissimilar or the same connector style may be used at each end.

The adjuster 14 also includes a belt locking device 26 attached to the guide portion 30 in the figures. Belt locking device 26 engages the adjuster strap 16 in a manner permitting the strap to pass through the device in one direction, but prevents movement of the adjuster strap 16 in the opposite direction. One such locking device shown in FIGS. 1 through 3 and 7, 8 is commonly known as a cam-lock. It includes a frame or housing 39 with a belt guide 40 to position the belt and limit belt movement within the guide. Adjuster 14 also includes a belt locking device 26, known as a spring-loaded pivoting cam or pawl, which slidingly traps the belt as the belt slides between the belt locking device 26 and the web stop or pressure plate 41 when engaged, and a release end 44 which allows the cam to be pivoted toward a release position by a user. Pivoting the cam 26 releases the adjuster belt 16 and allows it to move or slide freely in either direction within the belt guide 40. The cam lock is arranged so that the adjuster belt 16 may be pulled in the direction that increases tension in the adjuster (reduces the separation between the first and second adjuster portions) without restriction from the cam lock, but prevents reverse movement or sliding of the adjuster belt unless the user releases the cam 26. In this manner, the locking device will allow tension in the tie down strap 10 to be increased to securely hold an unstable load and maintain that tension until the user releases the locking device to remove or adjust the load. There are numerous functionally equivalent belt locking mechanisms that may be employed within the scope and spirit of the invention.

In combination with the aforementioned adjuster 14 the present invention works symbiotically with a second lead strap adjuster 12. The adjuster 12 embodying aspects of the present invention is presented in FIGS. 1 through 8. The adjuster comprises a first adjuster guide 28, a second guide portion 19, and adjuster strap 17. One of the adjuster portions 28, 19 include a belt locking device through which the adjuster strap 17 is directed so that it engages the adjuster strap 17 in a manner permitting the strap to pass through the device in one direction, but prevents movement of the adjuster strap 17 in the opposite direction. One such locking device, commonly known as a cam-lock is disclosed in FIGS. 1 through 3 and 7, 8. It includes a frame or housing 37 with a belt guide 40 to position the belt and limit belt movement within the guide. Adjuster 12 also includes a belt locking device 29, known as a spring-loaded pivoting cam or pawl, which slidingly traps the belt as the belt slides between the belt locking device 29 and the web stop or pressure plate 43 when engaged, and a release end 44 which allows the cam to be pivoted toward a release position by a user. Pivoting the cam 29 releases the adjuster belt 17 and allows it to move or slide freely in either direction within the belt guide 40. A fixed end 21 of the adjuster strap 17 is connected to one of the guide portions 28, 19; the opposite (free) end 23 of the adjuster strap 17 is free so that it may be pulled by a user while pre-tightening a load or other use. In the embodiment shown, the belt locking device 29 is part of the adjuster assembly 24 while the fixed end of the strap 21 is part of the hook 18. Another configuration is permissible and is arranged by switching of the fixed end 21 and the belt locking device 29. In the present invention the fixed end 21 and the belt locking end are on opposing guide portions 19, 28 so as to maintain a single lead strap spanning the connector point 18 and the adjuster assembly 24. This advantageously eliminates the concern of convoluting the flexible webbing 17 so as to increase the friction and make the system unusable as in prior art with a block and tackle arrangement.

It can also be noted that the functionality of the prior art tie-down strap is maintained through the process of adjustment of the lead strap 12 while the block and tackle adjustment strap 14 is unaltered. This allows for the user option of securing a load with minimal tension from the lead strap 12 or higher tension through the block and tackle adjustment 14.

Disclosed in FIGS. 4, 5 is an embodiment of the present invention where the adjuster assembly 24 is reduced to a simple form. The guide portions 22, 30 and 19, 28 are simple openings in a flat plate 50. The belt locking devices 26, 29 are D-ring style locks that convolute the flexible webbing 16, 17 so as to lock it in a tensioned direction. This allows for ease of manufacturing and flexibility in the type of materials used for various applications. The belt locking devices 26, 29 in FIGS. 4, 5 include hole openings 52, 54 which when actuated away from the tension direction move the belt locking devices 26, 29 into a position so as to allow block and tackle portions 14 and lead strap portions 14 respectively to be in a somewhat free state. In this embodiment the block and tackle portion 14 and the lead strap portion 12 can be released essentially simultaneously though a squeezing motion from the user. The option to simultaneously release the lead strap and the block and tackle further displays the simplicity and easy that an arraignment of this type would give a user over any other tie down that exists.

FIG. 6 is a detail view of a tie down using a sewn connection joint 60 for the adjuster assembly portion 24. In this embodiment the belt locking devices 26, 29 are arraigned on independent frame members 62, 64. Additionally the adjuster portion 24 includes another variation of the belt locking device as is found in U.S. Pat. No. 6,820,310. under this arrangement the included components are more easily assembled from off-the-shelf components.

In the embodiment shown in FIGS. 7, 8 the adjuster assembly 24 is shown without the flexible webbing 16, 17 shown. It is disclosed that the belt locking devices 26, 29 shown are a unique shape so as to overlap one with the other. This arraignment allows a user to more optionally press both release levers 44, 45 simultaneously or independently depending on the desired effect of the user. Allowing this arraignment will be different for each type of belt locking device but it does require both belt locking devices 29, 26 to be incorporated as part of the adjuster assembly 24. Additionally it is also advantageous for guide portions 30, 28 and belt locking devices 26, 29 to be integrated into a single unitary frame as disclosed in FIGS. 1-5, 7, 8.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing summary illustrates the preferred embodiment of the invention; however, concepts, as based upon the description, may be employed in other embodiments without departing from the scope of the invention.

What is claimed is:

1. A cargo restraining device for securing a load, comprising:
   a lead strap having a first free end and a first fixed end;
   a first fastening member attached to said first fixed end;
   a first strap locking device constructed and arranged to releasably engage said lead strap, said first strap locking device biased in an engaged position to prevent movement of the lead strap in a direction that loosens the lead strap, wherein in a disengaged position, said first strap locking device does not prevent lead strap movement;
   spaced apart first and second guides;
   a second fastening member attached to said first guide;
   a lashing strap having a second free end and a second fixed end, said second fixed end attached at said second guide, said lashing strap trained around said first and second guides so as to multiply tension forces applied to said second free end;
   a second strap locking device constructed and arranged to releasably engage said lashing strap, said second strap locking device biased in an engaged position to prevent movement of the lashing strap in a direction that loosens the lashing strap, wherein in a disengaged position, said second strap locking device does not prevent lashing strap movement, said second strap locking device attached to said second guide, whereby said cargo restraining device has a tension force that is greater than said tension forces applied to said second free end.

2. The cargo restraining device of claim 1 wherein said first locking device is connected adjacent to said second locking device by an apparatus other than said lead strap and said lashing strap.

3. The cargo restraining device of claim 2 wherein said apparatus is a frame member interposed between said lashing strap and said lead strap.

4. The cargo restraining device of claim 1 wherein said first locking device is arranged proximate to said second locking device.

5. The cargo restraining device of claim 4 wherein said first and second locking devices are movably connected to a unitary frame member.

6. The cargo restraining device of claim 4 wherein said first and second strap locking devices have means for reasonably simultaneous movement into said disengaged position.

7. The cargo restraining device of claim 1 further comprising,
a first housing adapted to slidably receive said lead strap, said first housing including a first pressure plate having a first restraining surface over which said lead strap slides;
said first locking device having a second restraining surface, movably mounted to said first housing, said first locking device biased in said engaged position to cause said first and second restraining surfaces to engage and prevent movement of the lead strap in said direction that loosens the lead strap, wherein in said disengaged position, said second restraining surface is spaced from said first restraining surface so as not to prevent lead strap movement,
a second housing adapted to slidably receive said lashing strap, said second housing including a second pressure plate having a third restraining surface over which said lashing strap slides;
said second locking device having a fourth restraining surface, movably mounted to said second housing, said second locking device biased in said engaged position to cause said third and fourth restraining surfaces to engage and prevent movement of the lashing strap in said direction that loosens the lashing strap, wherein in said disengaged position, said fourth restraining surface is spaced from said third restraining surface so as not to prevent lashing strap movement.

8. The cargo restraining device of claim 7 wherein said first and second locking devices are adjacent to one another and said first and second housings are connected.

9. The cargo restraining device of claim 8 wherein said first locking device includes a first free end, said second locking device includes a second free end and said first and second free ends are proximate one another thereby allowing approximately simultaneous movement into said disengaged position.

10. The cargo restraining device of claim 1 wherein said first and second guides have a fixed rounded surface around which said lashing strap is directed.

11. A strap tensioning assembly, comprising:
a lead strap with a first free end and a first fixed end;
a first fastening member attached to said first fixed end;
a strap guide member;
a second fastening member;
a lashing strap with a second free end and a second fixed end, said lashing strap slidingly arranged over said strap guide member and said second fixed end attached to said second fastening member so as to multiply tension forces applied to said second free end;
a first housing adapted to slidably receive the lead strap, said first housing including a first pressure plate having a first restraining surface over which the lead strap slides;
a first strap lock constructed and arranged to movably engage and release the lead strap, said first strap lock having a second restraining surface, movably mounted to said first housing, said first strap lock biased in an engaged position to cause said first and second restraining surfaces to engage and prevent movement of the lead strap in a direction that loosens the lead strap, wherein in a disengaged position, said second restraining surface is spaced from said first restraining surface so as not to prevent lead strap movement, and
a second housing adapted to slidably receive the lashing strap, said second housing including a second pressure plate having a third restraining surface over which the lashing strap slides:
a second strap lock constructed and arranged to movably engage and release the lashing strap, said second strap lock connected adjacent to said first strap lock, said second strap lock connected distal to said strap guide member, said second strap lock having a fourth restraining surface, movably mounted to said second housing, said second strap lock biased in an engaged position to cause said third and fourth restraining surfaces to engage and prevent movement of said lashing strap in a direction that loosens said lashing strap, wherein in a disengaged position, said fourth restraining surface is spaced from said third restraining surface so as not to prevent lashing strap movement.

12. The strap tensioning assembly of claim 11 wherein said first and second strap locks have means of being movably disengaged in a single actuation.

13. A cargo restraining device for securing a load to a vehicle, comprising:
a lead strap having a first free end and a first fixed end;
a first fastening member connected to said first fixed end;
a first strap locking device constructed and arranged to releasably engage said lead strap, said first strap locking device biased in an engaged position to prevent movement of the lead strap in a direction that loosens the lead strap, wherein in a disengaged position, said first strap locking device does not prevent lead strap movement;
a lashing strap having a second free end and a second fixed end;
a second fastening member connected to said second fixed end;
a joining frame member interposed between said lashing and said lead straps;
a tension adjusting mechanism for adjusting the tension force between said first and said second fastening members, said tension adjusting mechanism interposed between said second fastening member and said joining frame member, said tension adjusting mechanism including:
a strap guide connected to said joining frame;
a second strap locking device constructed and arranged to releasably engage said lashing strap, said second strap locking device biased in an engaged position to prevent movement of said lashing strap in a direction that loosens said lashing strap, wherein in a disengaged position, said second strap locking device does not prevent lashing strap movement; and the lashing strap interposed between said strap guide and said second fastening member, and said lashing strap movably extending around said strap guide and then to said second strap locking device so as to multiply tension forces applied to said free end, to achieve said tension force when said second free end is moved in a tensioning direction.

14. The cargo restraining device of claim 13 wherein said first strap locking device is positioned proximate said second strap locking device.

15. The cargo restraining device of claim 14 wherein said first and second strap locking devices are arranged to releasably actuate nearly simultaneously.

* * * * *